(12) United States Patent
Chang

(10) Patent No.: US 9,405,158 B2
(45) Date of Patent: Aug. 2, 2016

(54) LIQUID CRYSTAL DISPLAY

(71) Applicant: Samsung Display Co., Ltd, Yongin, Gyeonggi-Do (KR)

(72) Inventor: Jong Woong Chang, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/324,868

(22) Filed: Jul. 7, 2014

(65) Prior Publication Data

US 2015/0062510 A1 Mar. 5, 2015

(30) Foreign Application Priority Data

Sep. 3, 2013 (KR) .......................... 10-2013-0105534

(51) Int. Cl.
- *G02F 1/1343* (2006.01)
- *G02F 1/1362* (2006.01)
- *G09G 3/36* (2006.01)

(52) U.S. Cl.
CPC .... *G02F 1/134336* (2013.01); *G02F 1/136286* (2013.01); *G02F 2001/134318* (2013.01); *G02F 2201/40* (2013.01); *G09G 3/3614* (2013.01); *G09G 3/3659* (2013.01); *G09G 2300/0426* (2013.01); *G09G 2300/0434* (2013.01); *G09G 2300/0465* (2013.01); *G09G 2320/0223* (2013.01)

(58) Field of Classification Search
CPC ................... G02F 1/136286; G02F 1/133707; G02F 1/134336; G02F 1/134363; G02F 1/1345; G02F 1/1393; G02F 1/136213
USPC .......................................... 349/139, 143, 141
See application file for complete search history.

(56) References Cited

U.S. PATENT DOCUMENTS

| | | | |
|---|---|---|---|
| 5,956,372 | A | 9/1999 | Vaman et al. |
| 7,471,831 | B2 | 12/2008 | Bearman et al. |
| 2007/0097072 | A1 | 5/2007 | Kim et al. |
| 2008/0259261 | A1 | 10/2008 | Park et al. |

(Continued)

FOREIGN PATENT DOCUMENTS

| | | |
|---|---|---|
| CN | 102998859 A | 3/2013 |
| KR | 10-2003-0027203 A | 4/2003 |

(Continued)

OTHER PUBLICATIONS

Extended European Search Report dated Feb. 5, 2015, for European Patent Application No. 14183368.1, (9 pgs).

*Primary Examiner* — Mike Qi
(74) *Attorney, Agent, or Firm* — Innovation Counsel LLP

(57) ABSTRACT

Provided is a liquid crystal display including a plurality of pixels disposed in a matrix of pixel rows and pixel columns, the liquid crystal display including: a plurality of gate lines formed on a first substrate and disposed two between every pixel row; a plurality of data lines formed on the first substrate and disposed one between every two adjacent pixel columns; a common voltage line formed on the first substrate and extending in a pixel row direction along a vertical center of the pixel; and a plurality of pixel electrodes and common electrodes formed on the first substrate and overlapping with each other with an insulating layer therebetween, each pixel electrode positioned in a pixel, and in which two pixel electrodes in the two pixel columns disposed between two adjacent data lines among the plurality of data lines are both connected to any one of the two data lines.

16 Claims, 11 Drawing Sheets

(56) References Cited

U.S. PATENT DOCUMENTS

| | | |
|---|---|---|
| 2009/0033608 A1 | 2/2009 | Kim |
| 2009/0262054 A1* | 10/2009 | Hsu .................... G09G 3/3648 345/87 |
| 2011/0128261 A1* | 6/2011 | Hung ................ G02F 1/136286 345/205 |
| 2011/0251230 A1 | 10/2011 | Shaw et al. |
| 2013/0021570 A1 | 1/2013 | Zhang |
| 2014/0160401 A1 | 6/2014 | Yonemura et al. |
| 2014/0168555 A1* | 6/2014 | Um ....................... G02F 1/1343 349/43 |

FOREIGN PATENT DOCUMENTS

| | | |
|---|---|---|
| KR | 10-2005-0123357 A | 12/2005 |
| KR | 10-2011-0033706 A | 3/2011 |
| KR | 10-2013-0018057 A | 2/2013 |

* cited by examiner

LIQUID CRYSTAL DISPLAY

CROSS-REFERENCE TO RELATED APPLICATION

This application claims priority to and the benefit of Korean Patent Application No. 10-2013-0105534 filed in the Korean Intellectual Property Office on Sep. 3, 2013, the entire contents of which are incorporated herein by reference.

BACKGROUND (a) Technical Field
The present invention relates to a liquid crystal display.
(b) Description of the Related Art
Liquid crystal displays, which are one of the most common types of flat panel displays currently in use, have two sheets of panels that include field generating electrodes, such as a pixel electrode, a common electrode, and the like, and a liquid crystal layer interposed therebetween. A liquid crystal display generates an electric field in the liquid crystal layer by applying voltage to the field generating electrodes, and the generated electric field determines the direction of liquid crystal molecules of the liquid crystal layer, thus controlling polarization of incident light so as to display images. Transmittance of the liquid crystal display may be increased as control of the liquid crystal molecules improves.

In one type of liquid crystal display, both the pixel electrode and the common electrode generating the electric field in the liquid crystal layer may be provided on one display panel that also includes a switching element. In such a liquid crystal display, a signal delay of the common voltage applied to the common electrode may occur. In order to prevent the signal delay of the common voltage, a common voltage line transferring a common voltage is formed in the pixel area. However, forming the common voltage line in the pixel area may cause an aperture ratio of the liquid crystal display to deteriorate.

The above information disclosed in this Background section is only for enhancement of understanding of the background of the disclosure and therefore it may contain information that does not form the prior art that is already known to a person of ordinary skill in the art.

SUMMARY

A liquid crystal display having advantages of reducing delay of a signal applied to a common electrode and preventing deterioration of an aperture ratio of the liquid crystal display is provided.

A liquid crystal display is provided including a plurality of pixels disposed in a matrix of pixel rows and pixel columns, the liquid crystal display including: a plurality of gate lines formed on a first substrate and disposed two between every pixel row; a plurality of data lines formed on the first substrate and disposed one between every two adjacent pixel columns; a common voltage line formed on the first substrate and extending in a pixel row direction along a vertical center portion of the pixel; and a plurality of pixel electrodes and common electrodes formed on the first substrate and overlapping with each other with an insulating layer therebetween, each pixel electrode positioned in a pixel. Two pixel electrodes in the two adjacent pixel columns disposed between two adjacent data lines among the plurality of data lines are both connected to any one of the two data lines.

The plurality of data lines may include a first portion and a second portion which extend in different directions and meet at a center of the pixel area, and the common voltage line may overlap with a meeting portion of the first portion and the second portion of the plurality of data lines.

The common voltage line may include a first extension and a second extension which extend in parallel with the data line, and the first extension and the second extension may be disposed between the two pixel electrodes.

The liquid crystal display may further include a second insulation substrate facing the first insulation substrate; and a light blocking member disposed on the second insulation substrate, in which the light blocking member may overlap with the first extension and the second extension of the common voltage line.

Edges of the two pixel electrodes may generate a first fringe field together with the first extension and the second extension of the common voltage line, the edges of the two pixel electrodes may generate a second fringe field together with the common electrode, and directions of the first fringe field and the second fringe field may be different from each other.

The liquid crystal display may further include a second substrate facing the first substrate; and a light blocking member formed on the second substrate, in which the first extension and the second extension of the common voltage line may not overlap with the light blocking member.

The common voltage line and the common electrode may be connected to each other through a contact hole formed in the insulating layer, the common voltage line may include a contact portion, and the contact hole may overlap with the contact portion.

The contact portion may be disposed between the two pixel electrodes.

An area of the contact portion may be larger than a cross-sectional area of the contact hole.

An area of the contact portion may be smaller than a cross-sectional area of the contact hole.

According to the example embodiments, it is possible to reduce delay of a signal applied to a common electrode and prevent deterioration of an aperture ratio of the liquid crystal display.

DETAILED DESCRIPTION OF THE EMBODIMENTS

Figure 1:
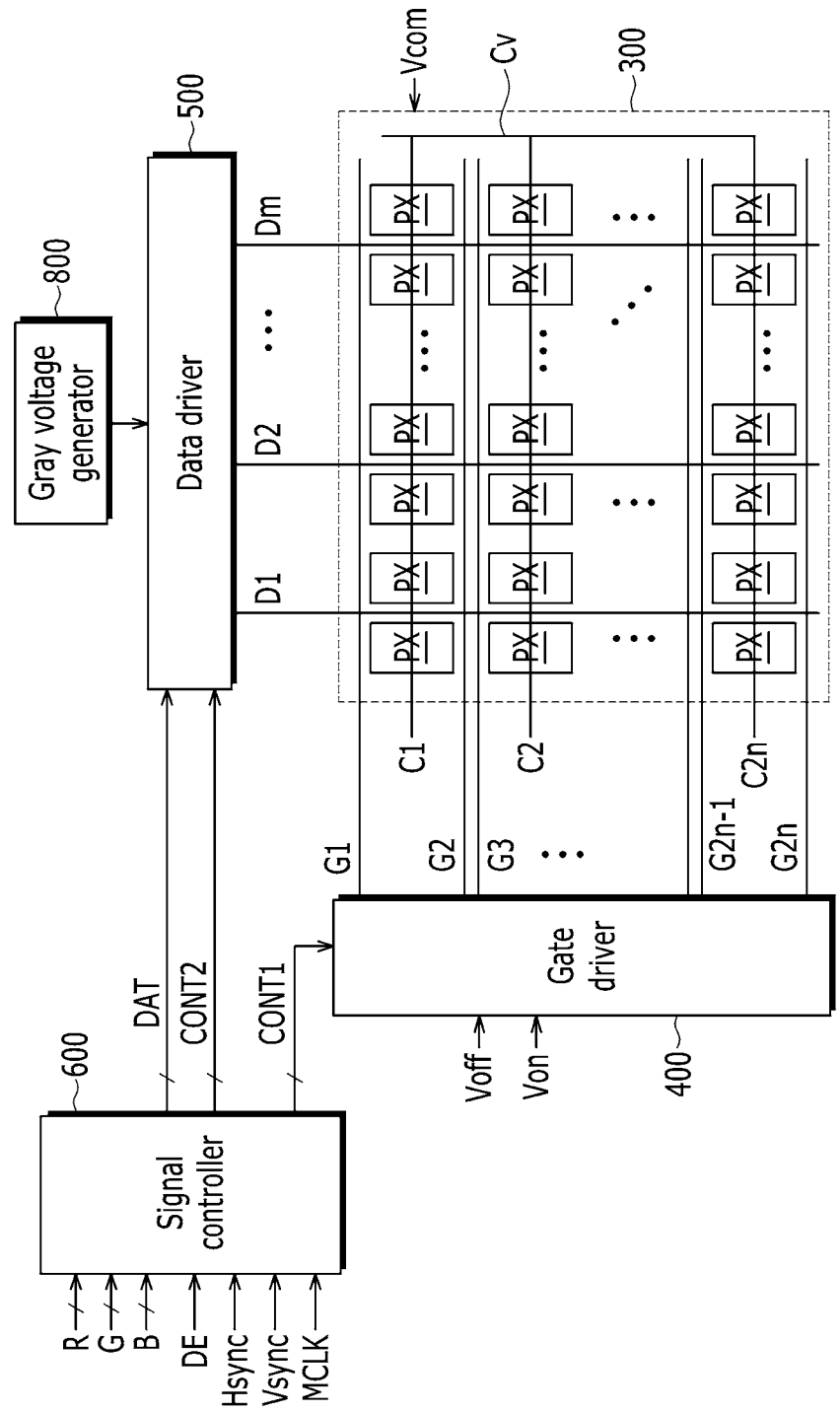
FIG. 1 is a block diagram of a liquid crystal display according to an example embodiment.

The example embodiments will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a liquid crystal display according to an example embodiment will be described in detail with reference to the accompanying drawings.

Figure 2:
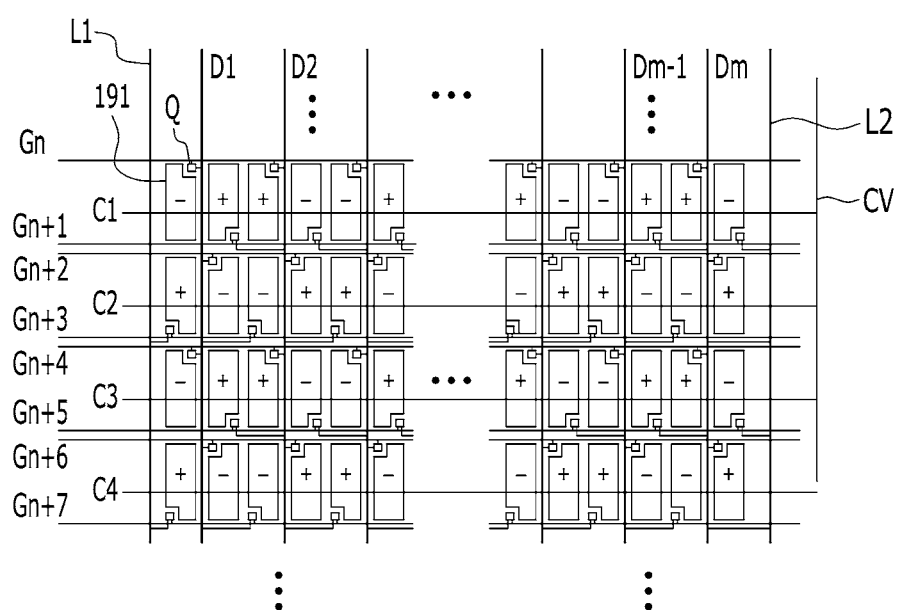
FIG. 2 is a structural diagram of the liquid crystal display according to an example embodiment.

FIG. 1 is a block diagram illustrating a liquid crystal display according to an example embodiment, and FIG. 2 is a structural diagram of the liquid crystal display according to an example embodiment.

As illustrated in FIG. 1, a liquid crystal display according to an example embodiment includes a liquid crystal panel assembly 300, a gate driver 400 and a data driver 500 connected to the liquid crystal panel assembly 300, a gray voltage generator 800 connected to the data driver 500, and a signal controller 600 controlling the elements of the display panel.

The liquid crystal panel assembly 300 includes a plurality of display signal lines G1-G2n D1-Dm, C1-C2n, Cv, L1, and L2, and a plurality of pixels PX connected to the display signal lines and arranged substantially in a matrix form when viewed from an equivalent circuit.

The display signal lines G1-G2n, D1-Dm, C1-C2n, Cv, L1, and L2 include a plurality of gate lines G1-G2n transferring gate signals (referred to as "scanning signals"), data lines D1-Dm transferring data signals, common voltage lines C1-C2n, a common voltage line connecting portion Cv, and dummy lines L1 and L2. The gate lines G1-G2n extend substantially in a row direction and are almost parallel to each other, and the data lines D1-Dm, and the dummy lines L1 and L2 extend substantially in a column direction and are almost parallel to each other. The common voltage lines C1-C2n extend in parallel to the plurality of gate lines G1-G2n, and the common voltage line connecting portion Cv connects the plurality of common voltage lines C1-C2n to each other and extends in parallel to the data lines D1-Dm.

The dummy line L1 and the dummy line L2 extend substantially across a row direction, around a leftmost edge of the liquid crystal panel assembly 300 and around a rightmost edge of the liquid crystal panel assembly 300, respectively and are almost parallel to the data lines D1-Dm.

As illustrated in FIG. 2, pairs of gate lines, such as Gn+1 and Gn+2, Gn+3 and Gn+4, . . . , are disposed on and below a pixel electrode 191 in one row. Further, the data lines D1-Dm are disposed between the pixel electrodes 191 every two columns. That is, one of the data lines D1-Dm is disposed between each pair of pixel columns. The connection between the gate lines G1-G2n and the data lines D1-Dm and the pixel electrodes 191 will be described in more detail.

Pairs of gate lines G1-G2n connected above and below the pixel electrodes 191 are connected to the corresponding pixel electrode 191 through a switching element !, which is disposed either above or below each pixel electrode 191.

That is, in an odd-numbered pixel row, a switching element Q connected to a pixel electrode positioned to the left side of the immediately adjacent data line D1-Dm (i.e., the data line D1-Dm directly to the right of the pixel electrode) is connected to the upper gate lines G1, G5, G9, . . . , (i.e., Gn, Gn+4 in FIG. 2), and a switching element Q connected to a pixel electrode positioned to the right side of the immediately adjacent data line D1-Dm (i.e., the data line D1-Dm directly to the left of the pixel electrode) is connected to the lower gate lines G2, G6, G10, . . . (i.e., Gn+1, Gn+5 in FIG. 2). In an even-numbered pixel row, connection of the upper gate lines G3, G7, G11, . . . and the lower gate lines G4, G8, G12, . . . and a switching element Q is the opposite to the connection thereof in the odd-numbered pixel row. That is, the switching element Q connected to a pixel electrode positioned to the right side of the immediately adjacent data lines D1-Dm (i.e., the data line D1-Dm directly to the left of the pixel electrode) is connected to the upper gate lines G3, G7, G11, . . . , (i.e., Gn+2, Gn+6 in FIG. 2) and the switching element Q connected to a pixel electrode positioned to the left side of the immediately adjacent data lines D1-Dm (i.e., the data line D1-Dm directly to the right of the pixel electrode) is connected to the lower gate lines G4, G8, G12, . . . (i.e., Gn+3, Gn+7 in FIG. 2).

The pixel electrode 191 positioned to the left side of the immediately adjacent data lines D1-Dm among the pixel electrodes 191 in the odd-numbered pixel row is connected to the immediately adjacent data lines D1-Dm through the switching element Q, and the pixel electrode 191 positioned to the right side of the immediately adjacent data lines D1-Dm is connected to the next adjacent data line to the right of the pixel electrode 191 through the switching element Q. The pixel electrode 191 positioned to the left side of the immediately adjacent data lines D1-Dm among the pixel electrodes 191 in the even-numbered pixel row is connected to the previous adjacent data line to the left of the pixel electrode 191 through the switching element Q, and the pixel electrode 191 positioned to the right side of the immediately adjacent data lines D1-Dm is connected to the immediately adjacent data line through the switching element Q. Further, the pixel electrode 191 in the first column and the even-numbered row is connected to the dummy line L1 connected to the last data line Dm, and the pixel electrode 191 in the last column and the odd-numbered row is connected to the dummy line L2 connected to the first data line D1.

As described above, the switching element formed at each pixel electrode is formed at a position which may be more easily connected to the connected data lines D1-Dm or the dummy lines L1 and L2, that is, a connection length from the switching element Q to the data line or dummy line may be as short as possible. Accordingly, in the layout illustrated in FIG. 2, the position of the switching element Q is changed for every pixel row. That is, in the odd numbered rows, the switching element Q is formed at an upper right end in the pixel disposed directly to the left side of the data lines D1-Dm among the pixel pairs, and the switching element Q is formed at a lower right end in the pixel disposed directly to the right side of the data lines D1-Dm.

In the even numbered rows, a formation position of the switching element Q of the pixel electrode is directly opposite to the formation position in the adjacent pixel row (which is an odd numbered row). That is, the switching element Q is formed at a lower left end of the pixel electrode disposed directly to the left side of the data lines D1-Dm among the pixel pairs, and the switching element Q is formed at an upper left end of the pixel disposed directly to the right side of the data lines D1-Dm.

In the connection of the pixel electrode 191 and the data lines D1-Dm illustrated in FIG. 2, in each pixel row, the switching elements Q of two pixel electrodes disposed between two adjacent data lines are connected to the same data line. That is, in the odd numbered pixel row, the switching elements of two pixel electrodes disposed between two data lines are connected to the data line disposed directly to the right side of the pair of pixel electrodes, and in the even numbered pixel row, the switching elements Q of two pixel electrodes disposed between two data lines are connected to the data line disposed directly to the left side of the pixel pair.

The layout illustrated in FIG. 2 is just one example, and the connection of the pixel electrodes 191 in the odd numbered rows and the even numbered rows and the data lines D1-Dm and the gate lines G1-G2n may be changed, and further, another connection relationship may be formed.

According to the connection relationship of the pixel electrodes 191 and the data lines D1-Dm and the gate lines G1-G2n, the data signals applied to the data lines D1-Dm form column inversion, while the adjacent pixel rows form dot inversion.

The common voltage lines C1-Cn are formed for each pixel row and connected to each other by the common voltage line connecting portion Cv to receive common voltages from the exterior of the display panel.

Hereinafter, the structure of the liquid crystal display illustrated in FIGS. 1 and 2 will be described in detail with reference to FIGS. 3 to 5.

Figure 3:
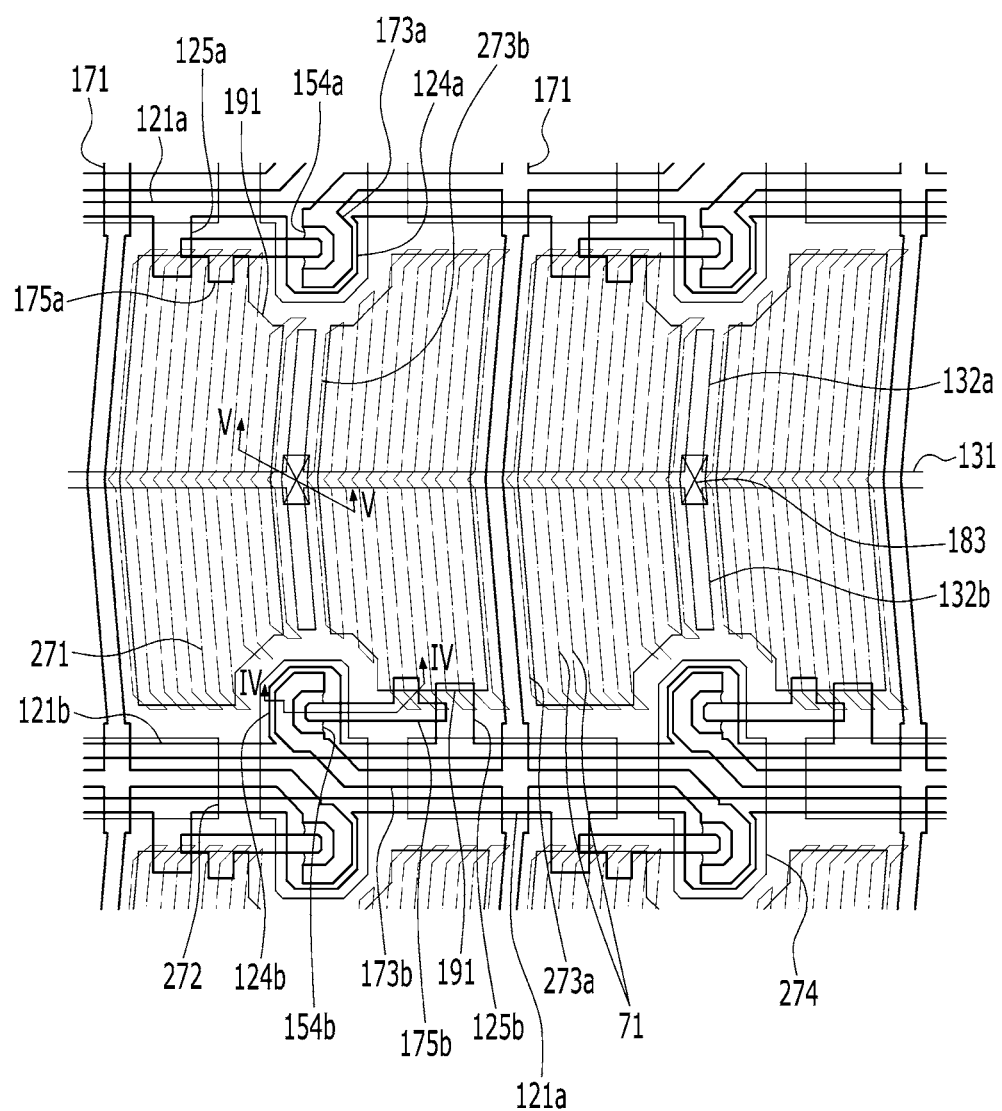
FIG. 3 is a layout view of the liquid crystal display according to an example embodiment.
Figure 4:
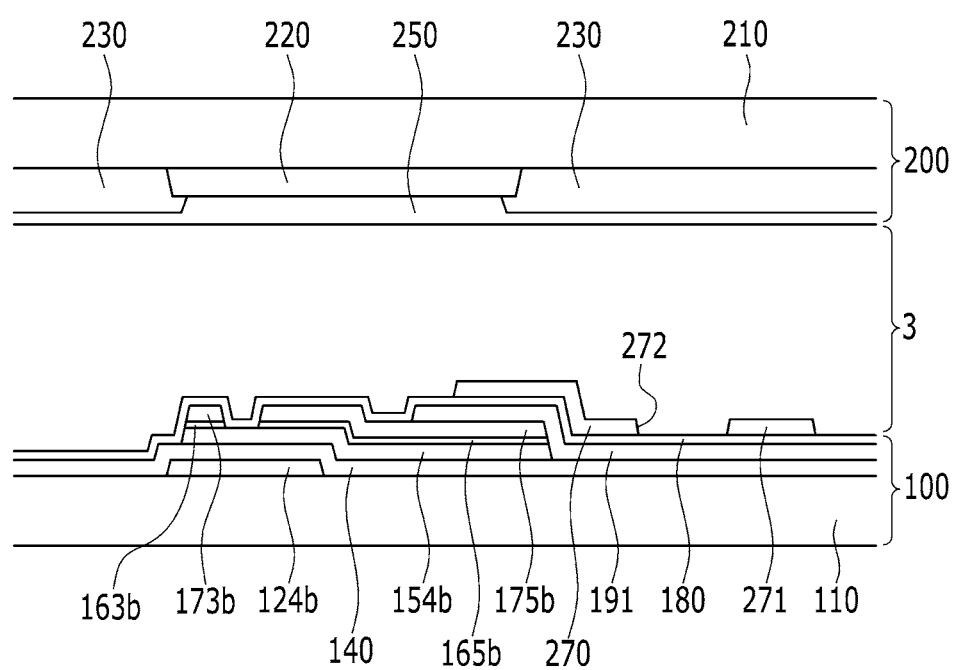
FIG. 4 is a cross-sectional view of the liquid crystal display of FIG. 3 taken along line IV-IV.
Figure 5:
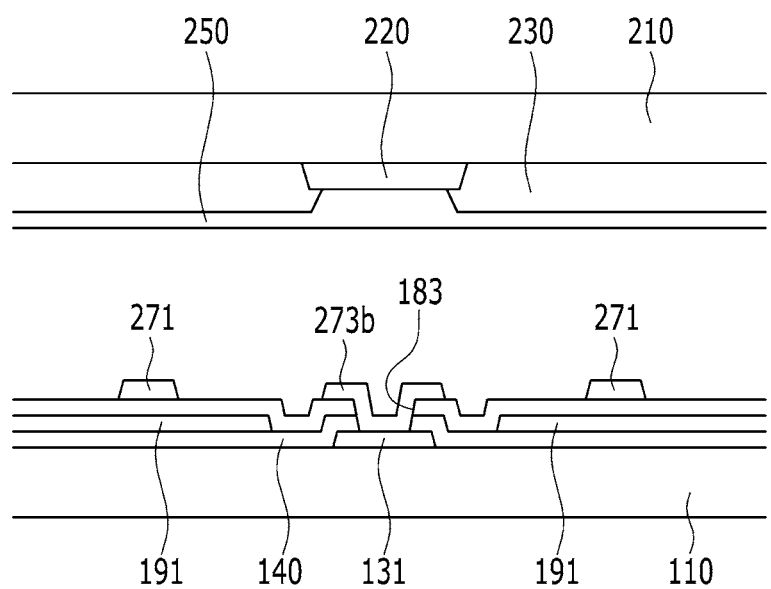
FIG. 5 is a cross-sectional view of the liquid crystal display of FIG. 3 taken along line V-V.

FIG. 3 is a layout view illustrating a liquid crystal display according to an example embodiment, FIG. 4 is a cross-sectional view of the liquid crystal display of FIG. 3 taken along line IV-IV, and FIG. 5 is a cross-sectional view of the liquid crystal display of FIG. 3 taken along line V-V.

Referring to FIGS. 3 to 5, a liquid crystal display according to an example embodiment includes a lower panel 100, an upper panel 200, and a liquid crystal layer 3 interposed between the two panels 100 and 200.

First, the lower panel 100 will be described in detail.

A plurality of gate lines 121a and 121b and a plurality of common voltage lines 131 are formed on a first substrate 110 made of transparent glass or the like.

The gate lines 121a and 121b mainly extend in a horizontal direction, a part of the gate lines 121a and 121b protrudes downward or upward to form gate electrodes 124a and 124b. The two gate lines 121a and 121b are adjacent to each other to make a pair. Alternatively, the top gate line 121b and the bottom gate line 121a may not make a pair.

The gate lines 121a and 121b include extensions 125a and 125b.

Each common voltage line 131 extends in parallel to the gate lines 121a and 121b between the gate lines 121a and 121b that make a pair, and is disposed at a center of a pixel area, that is the area covered by the pixel electrodes between two gate lines 121a and 121b and two data lines 171.

The common voltage line 131 includes a first extension 132a and a second extension 132b which are disposed between two adjacent data lines 171 and extend in parallel to the data line 171.

The gate lines 121a and 121b and the common voltage line 131 may be made, for example, of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). However, the gate lines 121a and 121b and the common voltage line 131 may also include two layers having different physical properties, that is, a lower layer (not illustrated) and an upper layer (not illustrated) thereon. The upper layer may be made of metal having low resistivity, for example, aluminum-based metal such as aluminum (Al) or an aluminum alloy, silver-based metal such as silver (Ag) or a silver alloy, and copper-based metal such as copper (Cu) or a copper alloy, so as to reduce a signal delay or a voltage drop of the gate lines 121a and 121b and the common voltage line 131. Unlike this, the lower layer may be made of another material, particularly, a material having an excellent contact characteristic with indium tin oxide (ITO) and indium zinc oxide (IZO), for example, chromium (Cr), molybdenum (Mo), a molybdenum alloy, tantalum (Ta), titanium (Ti), or the like. An example of a combination of materials for the lower layer and the upper layer may include a chromium/aluminum-neodymium (Nd) alloy.

A gate insulating layer 140 made of silicon nitride ($SiN_x$) or the like is formed on the gate lines 121a and 121b and the common voltage line 131.

A plurality of semiconductors 154a and 154b made, for example, of hydrogenated amorphous silicon (amorphous silicon is written as an acronym a-Si), polysilicon, or the like is formed on the gate insulating layer 140.

A plurality of island-shaped ohmic contacts 163a (not shown in FIG.), 163b, 165a (not shown in FIG.), and 165b which is made of silicide or a material such as n+ hydrogenated amorphous silicon in which n-type impurity is doped at high concentration is formed on the semiconductors 154a and 154b. The ohmic contacts 163a/163b and the ohmic contacts 165a/165b make pairs and are disposed on the semiconductors 154a/154b.

A data conductor including a plurality of data lines 171 and a plurality of drain electrodes 175a and 175b is formed on the ohmic contacts 163a, 163b, 165a, and 165b and the gate insulating layer 140.

The data line 171 includes a wide end portion (not illustrated) for connection with another layer or an external driving circuit. The data line 171 transfers a data signal and mainly extends in a vertical direction to cross the gate lines 121a and 121b.

The data line 171 may have a shaped portion having an angled or curved shape in order to allow for maximum transmittance of the liquid crystal display, and in this case the angled shape may have a V-lettered shape which meets in a middle region of the pixel area. Such a V-lettered shape may be formed with a first portion that extends to the middle region of the pixel area and a second portion which extends to the next gate line area form a predetermined angle with the first portion. That is, the data line 171 may include a first portion and a second portion extending in different directions, and the first portion and the second portion meet each other in the middle region of the pixel area to form a V-lettered shape.

The common voltage line 131 described above is formed at a position that overlaps with the position at which the first and the second portions of the data line 171 meet, referred to herein as the "meeting portion."

The meeting portion of the first portion and the second portion of the data line 171 is a portion having the smallest luminance of the liquid crystal display in the pixel area. Accordingly, it is possible to prevent deterioration of an aperture ratio of the liquid crystal display due to the formation of the common voltage line 131.

The data line 171 includes source electrodes 173a and 173b. The drain electrodes 175a and 175b include extensions for connection with the pixel electrode 191 to be described below, and one of the ends of the drain electrodes 175a and 175b face the source electrodes 173a and 173b, and the other of the ends of the drain electrodes 175a and 175b overlap with the extensions 125a and 125b of the gate lines 121a and 121b.

One of the ends of the drain electrodes 175a and 175b, particularly, an edge of a far side from the data line 171, overlap with the extensions 125a and 125b of the gate lines 121a and 121b. Then, because a mask for exposing a photosensitive film for the data line may not be aligned at an accurate position, the data line pattern moves to the left or the right. As a result, even though the drain electrodes 175a and 175b move to the left or the right, an area in which the drain electrodes 175a and 175b overlap with the gate electrodes 124a and 124b and the extensions 125a and 125b of the gate lines 121a and 121b is uniformly maintained. Accordingly, a capacity of a parasitic capacitor formed by overlapping of the gate conductor and the data conductor may be uniformly maintained.

The gate electrodes 124a/124b, the source electrodes 173a/173b, and the drain electrodes 175a/175b form a thin film transistor (TFT) together with the semiconductors 154a/154b, and a channel of the thin film transistor is formed in the semiconductors 154a/154b between the source electrodes 173a/173b and the drain electrodes 175a/175b.

The pixel electrode 191 is formed directly on each of the drain electrodes 175a and 175b. The pixel electrode 191 has a planar shape, that is, a plate shape, and is disposed in one pixel area.

A passivation layer 180 is formed on the data conductor 171, 173a, 173b, 175a, and 175b, the gate insulating layer 140, and an exposed portion of the semiconductors 154a and 154b, and the pixel electrode 191. However, in a liquid crystal display according to another example embodiment, the passivation layer 180 may be disposed between the pixel electrode 191 and the data line 171, and the pixel electrode 191 may also be connected with the drain electrodes 175a and 175b through a contact hole (not illustrated) formed in the passivation layer 180.

A contact hole 183 exposing the common voltage line 131 is formed in the passivation layer 180.

A common electrode 270 is formed on the passivation layer 180.

The common electrode 270 has a plurality of cutouts 71 and includes a plurality of branch electrodes 271 defined by the plurality of cutouts 71.

The common electrode 270 includes a horizontal connecting portion 272, a first vertical connecting portion 273a, and a second vertical connecting portion 273b, and the common electrodes 270 disposed in adjacent pixels are connected to each other through the horizontal connecting portion 272 and the vertical connecting portions 273a and 273b.

The horizontal connecting portion 272 of the common electrode 270 is disposed on the gate lines 121a and 121b, the first vertical connecting portion 273a of the common electrode 270 is disposed on the data line 171, and the second vertical connecting portion 273b is disposed between two adjacent pixel electrodes 191.

The second vertical connecting portion 273b of the common electrode 270 is connected with the common voltage line 131 through the contact hole 183 formed in the passivation layer 180.

The common electrode 270 has an opening 274 formed at a position overlapping with the thin film transistor forming the switching element.

The cutout 71 and the branch electrode 271 of the common electrode 270 are parallel to the data line 171.

Although not illustrated, an alignment layer is coated on the common electrode 270 and the passivation layer 180, and the alignment layer may be a horizontal alignment layer and is rubbed in a predetermined direction. However, in a liquid crystal display according to another example embodiment, the alignment layer includes a photoreactive material to be photo-aligned.

Next, the upper panel 200 will be described.

A light blocking member 220 is formed on a second substrate 210. A plurality of color filters 230 are further formed on the second substrate 210. The color filters 230 may be disposed on the lower panel 100, and in this case, the light blocking member 220 may also be disposed on the lower panel 100.

An overcoat 250 is formed on the color filter 230 and the light blocking member 220. The overcoat 250 may be omitted.

An alignment layer, not shown, may be disposed on the overcoat 250.

The liquid crystal layer 3 includes a liquid crystal material having positive dielectric anisotropy or negative dielectric anisotropy. Liquid crystal molecules of the liquid crystal layer 3 are aligned so that long axes thereof are parallel to the panels 100 and 200, and may be disposed to have pretilt angles in a rubbing direction of the alignment layer.

In the liquid crystal display according to the example embodiment, the pixel electrode 191 has a planar shape formed throughout each pixel area, and the common electrode 270 has a plurality of branch electrodes 271, but according to a liquid crystal display according to another example embodiment, the common electrode 270 has a planar shape formed throughout each pixel area, and the pixel electrode 191 may have a plurality of branch electrodes defined by the cutouts.

Referring to FIGS. 3 and 5, the contact hole 183 for connecting the common voltage line 131 and the common electrode 270 is disposed between two adjacent data lines 171 and disposed between two adjacent pixel electrodes 191.

Accordingly, it is possible to prevent deterioration of an aperture ratio due to the contact hole 183 for connecting the common voltage line 131 and the common electrode 270.

According to the liquid crystal display according to the example embodiment, the first extension 132a and the second extension 132b of the common voltage line 131 are disposed between two adjacent data lines 171 and disposed between two adjacent pixel electrodes 191. Accordingly, it is possible to prevent light leakage which may occur in the two adjacent pixel electrodes 191, and thus it is possible to reduce a width of the light blocking member 220 formed between the two adjacent pixel electrodes 191. Generally, in order to prevent light leakage due to misalignment of the light blocking member 220 formed on the upper panel 200 and the pixel electrode 191 formed on the lower panel 100, a width of the light blocking member 220 is largely formed by a misalignment error. However, according to the liquid crystal display according to the example embodiment, the extensions 132a and 132b of the common voltage line 131 are formed on the lower panel 100 and disposed between the two pixel electrodes 191 formed between the adjacent data lines 171 to prevent light leakage which may occur between the adjacent pixel electrodes 191, and as a result, even though the width of the light blocking member 220 formed in the upper panel 200 is decreased, the light leakage between the two adjacent pixel electrodes 191 may be prevented. Accordingly, the aperture ratio of the liquid crystal display increases.

Therefore, a signal delay of the common voltage applied to the common electrode 270 of the liquid crystal display is prevented and deterioration of the aperture ratio of the liquid crystal display may be prevented.

The common voltages having the same magnitude are applied to the common voltage line 131 and the common electrode 270.

Accordingly, a first fringe field generated between edges of the two adjacent pixel electrodes 191 disposed between the two adjacent data lines 171 and the common voltage line 131 disposed below the pixel electrode 191, and a second fringe field generated between the edges of the two adjacent pixel electrodes 191 disposed between the two adjacent data lines 171 and the common electrode 270 disposed on the pixel electrode 191 have the same magnitude, and directions thereof are opposite to each other. Therefore, the first fringe field and the second fringe field may be offset.

When the fringe field is applied to the liquid crystal molecules disposed between the two adjacent pixel electrodes, a mixed color may be generated between colors displayed by the two adjacent pixels. Accordingly, in the case of a general liquid crystal display, in order to prevent the mixed color, a distance between the two adjacent pixel electrodes is largely formed.

However, according to the liquid crystal display according to the example embodiment, the fringe field between the pixel electrode and the common voltage line and the fringe field between the pixel electrode and the common electrode are offset by forming the extension of the common voltage line between the edges of the two adjacent pixel electrodes, and as a result, even though the distance between the two adjacent pixel electrodes is decreased, it is possible to prevent the mixed color between the colors displayed by the two adjacent pixels. As such, the distance between the two adjacent pixel electrodes is decreased, and thus the aperture ratio of the liquid crystal display increases.

Figure 6:
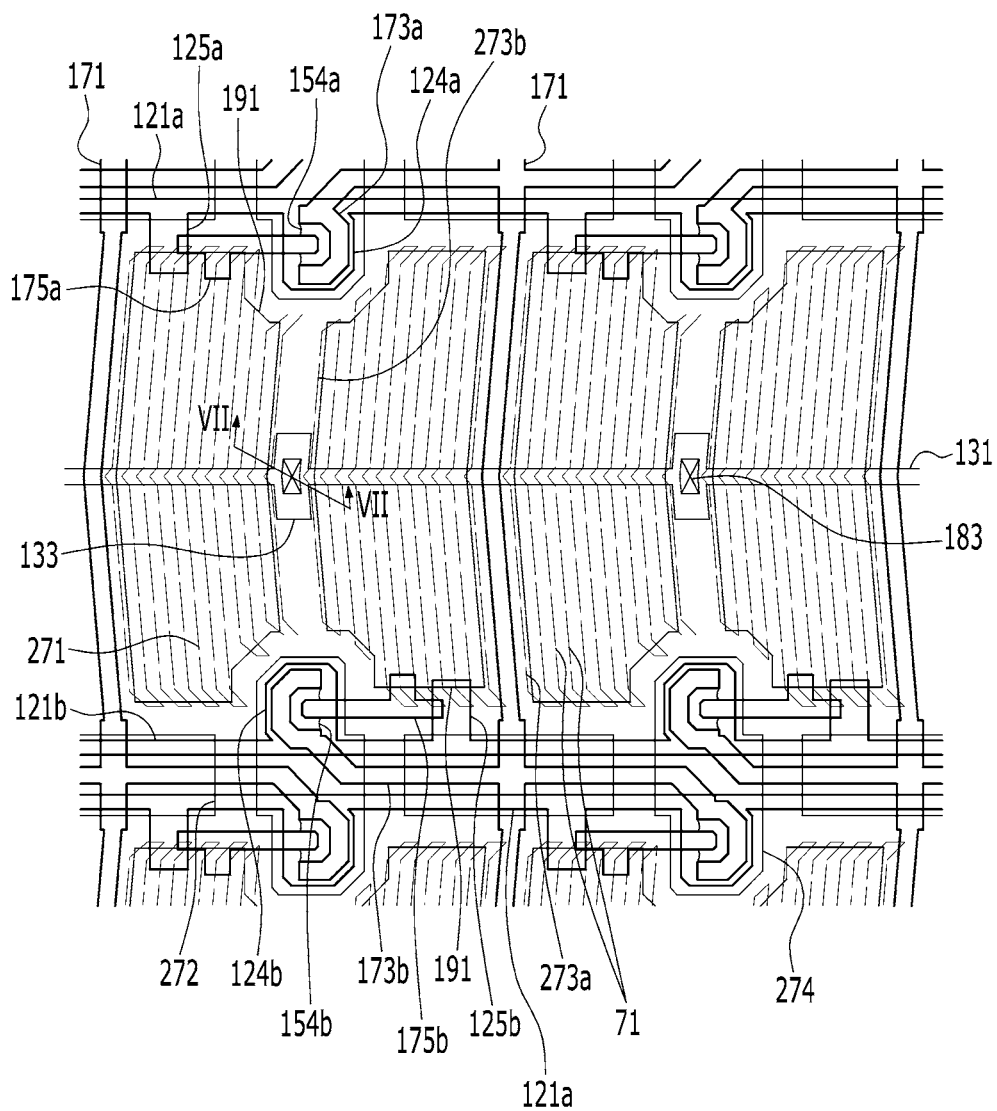
FIG. 6 is a layout view of a liquid crystal display according to another example embodiment.

Next, a liquid crystal display according to another example embodiment will be described with reference to FIGS. 6 and 7. FIG. 6 is a layout view illustrating a liquid crystal display according to another example embodiment of the present invention, and FIG. 7 is a cross-sectional view of the liquid crystal display of FIG. 6 taken along line VII-VII.

Figure 7:
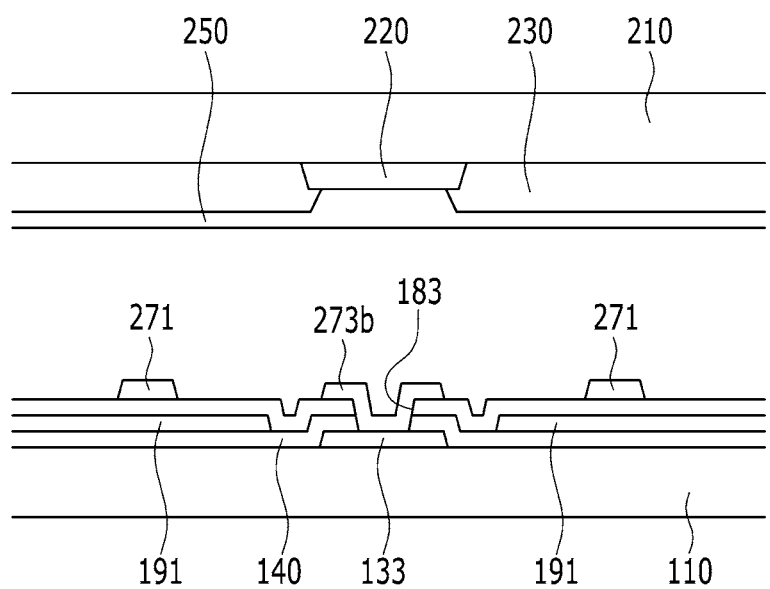
FIG. 7 is a cross-sectional view of the liquid crystal display of FIG. 6 taken along line VII-VII.

Referring to FIGS. 6 and 7, the liquid crystal display according to the example embodiment is almost similar to the liquid crystal display according to the example embodiment described with reference to FIGS. 3 to 5. Therefore, detailed description for like constituent elements is omitted.

However, in the liquid crystal display according to the example embodiment, unlike the example embodiment described with reference to FIGS. 3 to 5, the common voltage line 131 includes a first contact portion 133 formed at a position where the contact hole 183 is to be formed.

The first contact portion 133 is formed between the two adjacent pixel electrodes 191 of the liquid crystal display to connect the common voltage line 131 and the common electrode 270 without deterioration of the aperture ratio of the liquid crystal display.

Because an area of the first contact portion 133 is larger than an area of the contact hole 183, even though misalignment occurs when the contact hole 183 is formed, the contact hole 183 may be formed on the first contact portion 133. Accordingly, even though misalignment occurs when the contact hole 183 is formed, the common voltage line 131 and the common electrode 270 may be stably connected to each other through the contact hole 183.

All features of the liquid crystal display according to the example embodiment described with reference to FIGS. 3 to 5 may be applied to the liquid crystal display according to the example embodiment.

Figure 8:
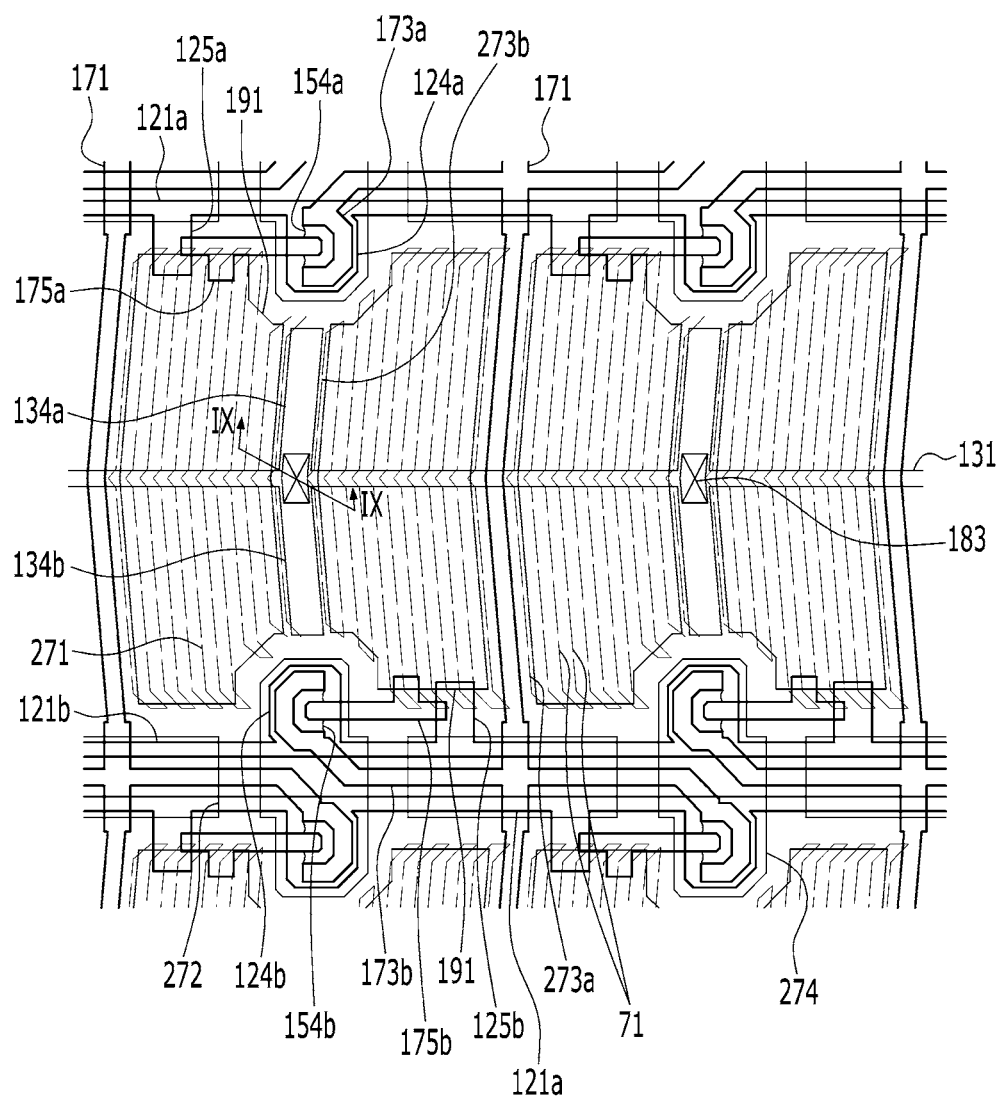
FIG. 8 is a layout view illustrating a liquid crystal display according to another example embodiment.

Next, a liquid crystal display according to another example embodiment will be described with reference to FIGS. 8 and 9. FIG. 8 is a layout view of a liquid crystal display according to another example embodiment, and FIG. 9 is a cross-sectional view of the liquid crystal display of FIG. 8 taken along line IX-IX.

Figure 9:
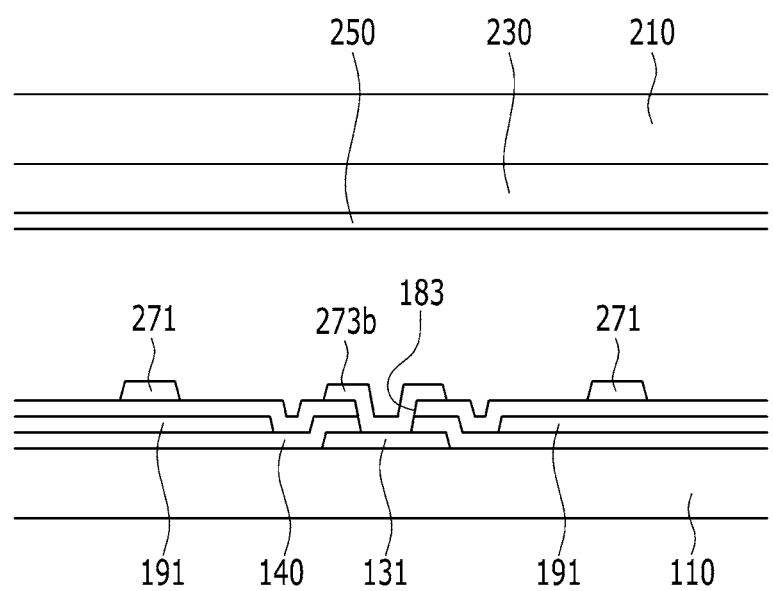
FIG. 9 is a cross-sectional view of the liquid crystal display of FIG. 8 taken along line IX-IX.

Referring to FIGS. 8 and 9, the liquid crystal display according to the example embodiment is almost similar to the liquid crystal display according to the example embodiment described with reference to FIGS. 3 to 5. Therefore, detailed description for like constituent elements is omitted.

However, in the liquid crystal display according to the example embodiment, unlike the example embodiment described with reference to FIGS. 3 to 5, the common voltage line 131 includes a third extension 134a and fourth extension 134b having larger areas than the first extension 132a and the second extension 132b shown in FIG. 3.

As such, the common voltage line 131 includes the third extension 134a and the fourth extension 134b having large areas, thereby sufficiently preventing light leakage which may occur between the two adjacent pixel electrodes 191. Referring to FIG. 9, according to the liquid crystal display according to the example embodiment, even though the light blocking member 220 is not formed on the upper panel 200, the light leakage which may occur between the adjacent pixel electrodes 191 may be prevented. Accordingly, the light blocking member 220 is not formed between the adjacent pixel electrodes 191, and as a result, the aperture ratio of the liquid crystal display increases.

According to the liquid crystal display according to the example embodiment, the fringe field between the pixel electrode and the common voltage line, and the fringe field between the pixel electrode and the common electrode, are offset by forming the extension of the common voltage line between the edges of the two adjacent pixel electrodes, and as a result, even though the distance between the two adjacent pixel electrodes is decreased, it is possible to prevent the mixed color between the colors displayed by the two adjacent pixels. As such, the distance between the two adjacent pixel electrodes is decreased, and thus the aperture ratio of the liquid crystal display increases.

All features of the liquid crystal display according to the example embodiment described above with reference to FIGS. 3 to 5 may be applied to the liquid crystal display according to the example embodiment.

Figure 10:
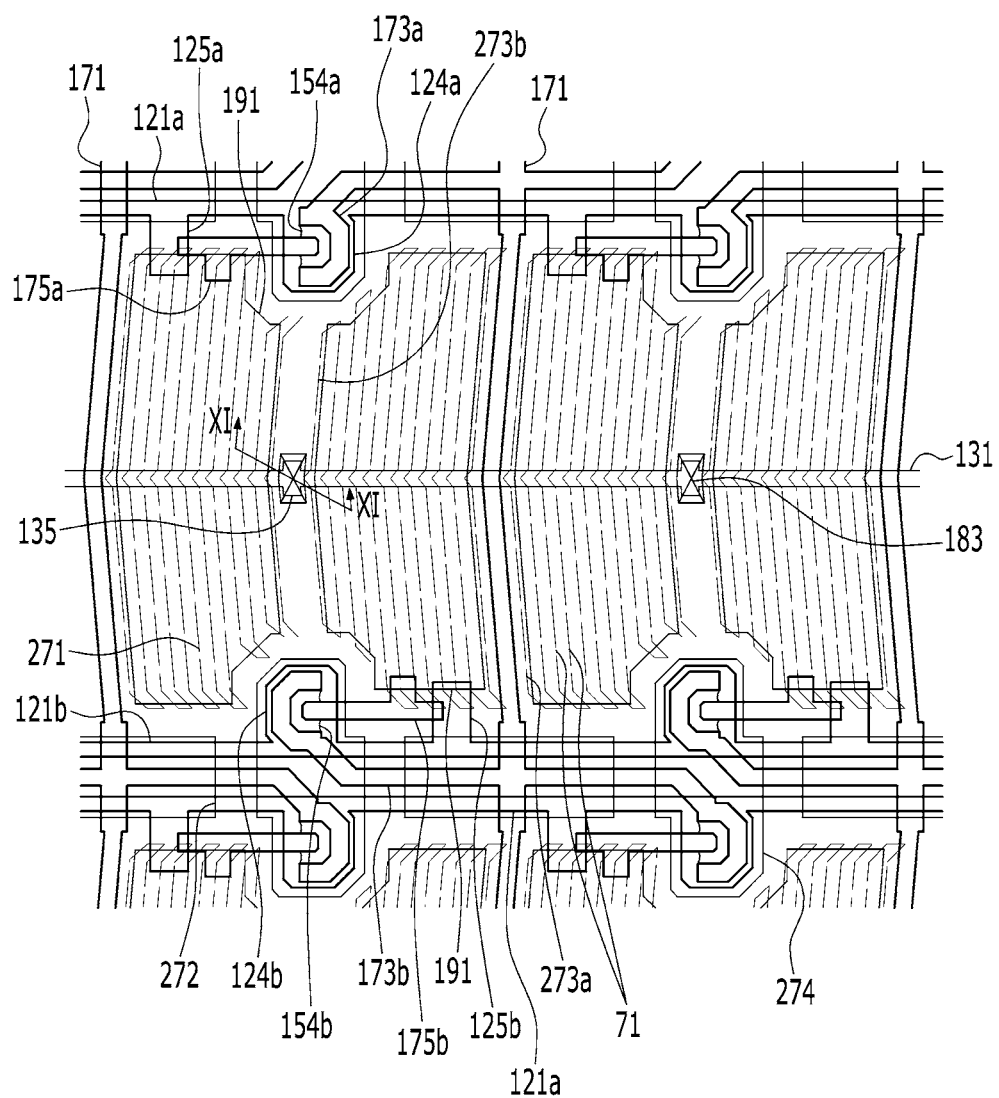
FIG. 10 is a layout view illustrating a liquid crystal display according to another example embodiment.

Next, a liquid crystal display according to another example embodiment will be described with reference to FIGS. 10 and 11. FIG. 10 is a layout view illustrating a liquid crystal display according to another example embodiment, and FIG. 11 is a cross-sectional view of the liquid crystal display of FIG. 10 taken along line XI-XI.

Figure 11:
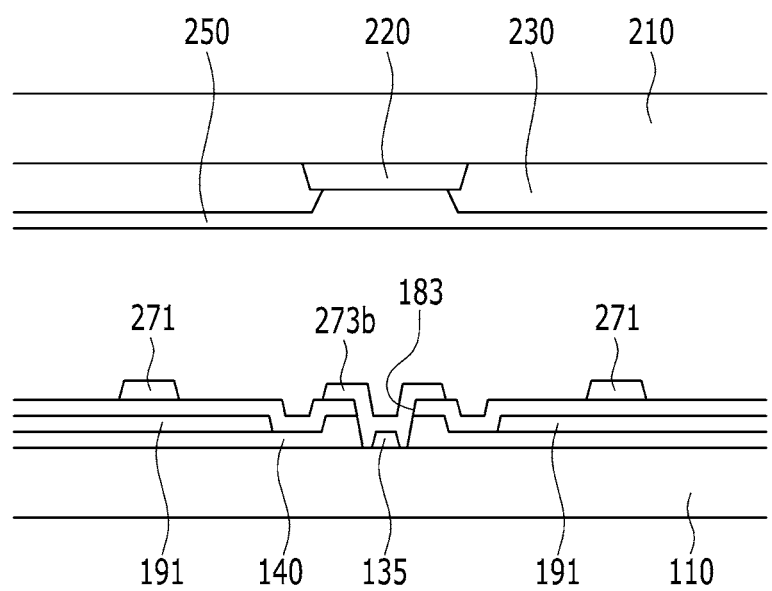
FIG. 11 is a cross-sectional view of the liquid crystal display of FIG. 10 taken along line XI-XI.

Referring to FIGS. 10 and 11, the liquid crystal display according to the example embodiment is almost similar to the liquid crystal display according to the example embodiment described with reference to FIGS. 3 to 5. Therefore, detailed description for like constituent elements is omitted.

However, in the liquid crystal display according to the example embodiment, unlike the example embodiment described with reference to FIGS. 3 to 5, the common voltage line 131 includes a second contact portion 135 formed at a position where the contact hole 183 is to be formed.

The second contact portion 135 is formed between the two adjacent pixel electrodes 191 of the liquid crystal display to connect the common voltage line 131 and the common electrode 270 without deterioration of the aperture ratio of the liquid crystal display.

An area of the second contact portion 135 is smaller than the area of the contact hole 183. The area of the second contact portion 135 is smaller than the area of the contact hole

183, and as a result, deterioration of the aperture ratio due to the contact hole 183 may be prevented.

All features of the liquid crystal display according to the example embodiment described above with reference to FIGS. 3 to 5 may be applied to the liquid crystal display according to the example embodiment.

While example embodiments have been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of symbols>

| | |
|---|---|
| 110, 210: Insulation substrate | 3: Liquid crystal layer |
| 121a, 121b: Gate line | 124a, 124b: Gate electrode |
| 131: Common voltage line | 140: Gate insulating layer |
| 154a, 154b: Semiconductor | |
| 163a, 163b, 165a, 165b: Ohmic contact | |
| 171: Data line | 173a, 173b: Source electrode |
| 175a, 175b: Drain electrode | 180: Passivation layer |
| 191: Pixel electrode | 270: Common electrode |

What is claimed is:

1. A liquid crystal display including a plurality of pixels disposed in a matrix of pixel rows and pixel columns, the liquid crystal display comprising:
a pair of gate lines disposed on a first substrate in a cross-sectional view and disposed between adjacent pixel rows in a layout view;
a data line disposed on the first substrate in the cross-sectional view and disposed between adjacent pairs of pixel columns in the layout view;
a common voltage line disposed on the first substrate in the cross-sectional view and extending in a pixel row direction along a vertical center of the pixel in the layout view;
a pixel electrode disposed on the first substrate in the cross-sectional view and positioned in a pixel in the layout view; and
a common electrode overlapping the pixel electrode with an insulating layer therebetween in the cross-sectional view,
wherein switching elements of two pixel electrodes in the adjacent pair of pixel columns are both connected to any one of two data lines adjacent to the pair of pixel columns.

2. The liquid crystal display of claim 1, wherein:
the data lines includes a first portion and a second portion which extend in different directions and meet at a center of the pixel area, and
the common voltage line overlaps with a meeting portion of the first portion and the second portion of the plurality of data lines.

3. The liquid crystal display of claim 2, wherein:
the common voltage line includes a first extension and a second extension which extend in parallel with the data line, and
the first extension and the second extension are disposed between the two pixel electrodes adjacent to each other.

4. The liquid crystal display of claim 3, further comprising:
a second substrate facing the first substrate; and
a light blocking member formed on the second substrate,
wherein the light blocking member overlaps with the first extension and the second extension of the common voltage line.

5. The liquid crystal display of claim 4, wherein:
edges of the two pixel electrodes generate a first fringe field together with the first extension and the second extension of the common voltage line,
the edges of the two pixel electrodes generate a second fringe field together with the common electrode, and
directions of the first fringe field and the second fringe field are different from each other.

6. The liquid crystal display of claim 3, further comprising:
a second substrate facing the first substrate; and
a light blocking member formed on the second substrate,
wherein the first extension and the second extension of the common voltage line do not overlap with the light blocking member.

7. The liquid crystal display of claim 6, wherein:
edges of the two pixel electrodes generate a first fringe field together with the first extension and the second extension of the common voltage line,
the edges of the two pixel electrodes generate a second fringe field together with the common electrode, and
directions of the first fringe field and the second fringe field are different from each other.

8. The liquid crystal display of claim 2, wherein:
the common voltage line and the common electrode are connected to each other through a contact hole formed in the insulating layer,
the common voltage line includes a contact portion, and
the contact hole overlaps with the contact portion.

9. The liquid crystal display of claim 8, wherein:
the contact portion is disposed between the two pixel electrodes adjacent to each other.

10. The liquid crystal display of claim 9, wherein:
an area of the contact portion is larger than a cross-sectional area of the contact hole.

11. The liquid crystal display of claim 9, wherein:
an area of the contact portion is smaller than a cross-sectional area of the contact hole.

12. The liquid crystal display of claim 1, wherein:
the common voltage line includes a first extension and a second extension which extend in parallel to the data line, and
the first extension and the second extension are disposed between the two pixel electrodes adjacent to each other.

13. The liquid crystal display of claim 12, further comprising:
a second substrate facing the first substrate; and
a light blocking member formed on the second substrate,
wherein the light blocking member overlaps with the first extension and the second extension of the common voltage line.

14. The liquid crystal display of claim 13, wherein:
edges of the two pixel electrodes generate a first fringe field together with the first extension and the second extension of the common voltage line,
the edges of the two pixel electrodes generate a second fringe field together with the common electrode, and
directions of the first fringe field and the second fringe field are different from each other.

15. The liquid crystal display of claim 12, further comprising:
a second substrate facing the first substrate; and
a light blocking member formed on the second substrate, wherein the first extension and the second extension of the common voltage line do not overlap with the light blocking member.

16. The liquid crystal display of claim 15, wherein:
edges of the two pixel electrodes generate a first fringe field together with the first extension and the second extension of the common voltage line,
the edges of the two pixel electrodes generate a second fringe field together with the common electrode, and
directions of the first fringe field and the second fringe field are different from each other.

* * * * *